2,953,844

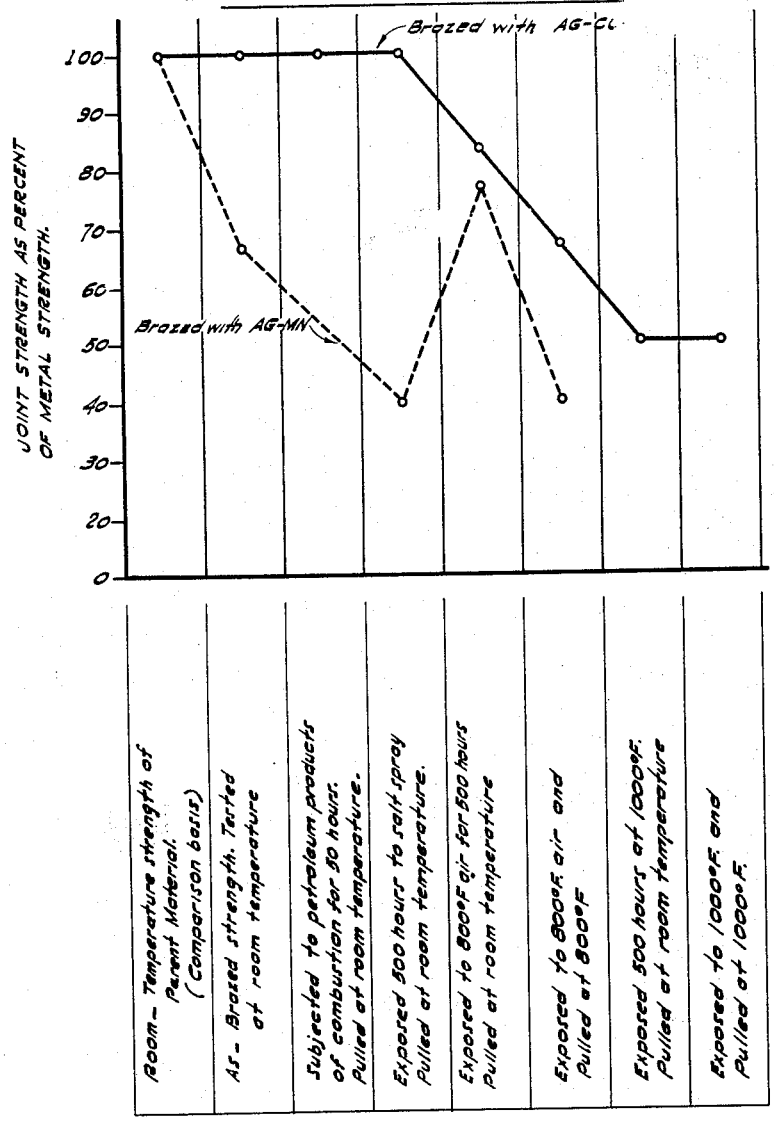

BRAZED STAINLESS STEEL JOINT AND METHOD OF BRAZING SAME

Amiel Gelb and George E. Korb, Indianapolis, Ind., assignors to Stewart-Warner Corporation, Chicago, Ill., a corporation of Virginia Filed Aug. 1, 1957, Ser. No. 675,613

4 Claims. (Cl. 29—183.5)

This invention relates to an improved brazed joint of extremely thin stainless steel components and to an improved method of brazing extremely thin stainless steel components.

A primary object of this invention is the provision of an improved brazed joint of stainless steel components having wall thicknesses in the order of .002".

It is another primary object of this invention to provide an improved method of brazing stainless steel components having wall thicknesses in the order of .002".

Another object of this invention is to provide an improved high temperature brazing alloy having excellent brazability with nickel and chromium alloys, and especially the various types of stainless steels.

Another object is to provide a brazing alloy which has a high oxidation and corrosion resistance and which does not appreciably undercut the parent metal.

In the brazing of metal components, particularly thin sections that are destined for elevated temperature service from 500° F. to 1000° F., several alloys have been proposed in the prior art to join the materials to be united. For example, substantially pure silver, substantially pure copper, and silver-manganese alloys, with the manganese ranging from 5 to 15%, have been employed with limited success in brazing components fabricated from nickel alloys, nickel-chromium-iron, or iron-chromium alloys.

Each of the foregoing brazing compositions possesses certain disadvantages which have been overcome by the silver-copper-nickel alloy composition of this invention. The improvements resulting from the novel alloy described herein, particularly for the type of service that is encountered in high temperature aircraft applications, such as in heat exchangers and in honeycomb skin sections, can best be understood from the following listing of disadvantages characteristic of some of the currently used alloys. Substantially pure silver possesses relatively low strength at elevated temperatures and corrodes readily at high temperatures in sulfur containing atmospheres such as result from the combustion of petroleum products. Substantially pure copper, in addition to a higher liquidus temperature than that of silver, has the disadvantage of possessing poor resistance to oxidation at elevated temperatures. This alloy also has the tendency of dissolving in and penetrating into the grains of the parent metal being brazed, thus weakening the structure. Silver-manganese alloys have a generally poor corrosion resistance in a salt-laden atmosphere and also poor flowing and wetting properties.

The composition range for the alloy of this invention is as follows:

| | | |
|---|---|---|
| Silver | percent | 55 to 75 |
| Copper | do | 20 to 37 |
| Nickel, Cobalt and mixtures thereof | do | 1 to 8 |

A preferred and specific alloy composition within the foregoing ranges for constituents is as follows:

| | | |
|---|---|---|
| Silver | percent | 65 |
| Copper | do | 30 |
| Nickel | do | 5 |

To obtain improved physical, chemical and mechanical properties in the commercial brazing alloys, the addition of nickel to either the silver or copper has been considered heretofore. It was thought that nickel would impart desirable characteristics to brazing alloys that are to be used to join nickel-bearing metals. It was found, however, that nickel cannot be added to silver, since it is soluble to less than 0.1% at the melting temperature of silver, and to only about 0.01% at intermediate temperatures.

Moreover, although nickel can be dissolved in copper, only about 1% is soluble at 2000° F., which is somewhat above the melting point of pure copper. Such a high melting solder is not, however, within the desired temperature range for many applications and since the copper content is so high, the inherent undesirable characteristics of the copper are not overcome.

In arriving at the above alloy composition, several factors have been combined which would yield the desired characteristics. To insure improved fluidity and brazability, as narrow a band between the liquidus and the solidus is desired. The relative amounts of the silver and copper were selected with this in mind, being within the eutectic composition range for these metals. The amount of nickel blended into this composition is that which is soluble in the mixture. By virtue of the proper selection of the constituents, the following advantages are gained: (1) the nickel refines the grains by restraining grain growth on heating; (2) the mechanical properties of the alloy, particularly at elevated temperatures, are increased; (3) the corrosion resistance of the alloy is enhanced; and (4) the compatibility of the brazing alloy to adhere to nickel—or chromium—containing metals is improved, without at the same time alloying too deeply with the parent material so as to be detrimental.

The novel alloy composition described herein overcomes the objections and the disadvantages listed earlier. Furthermore, the alloys in the composition range described below have the following desirable characteristics: (1) excellent brazability with nickel and chromium alloys, and especially the various types of stainless steels. Various brazing methods and/or atmospheres may be employed to braze these alloys. Dry hydrogen, or a mixture of hydrogen and nitrogen formed by the dissociation of ammonia, yield excellent results; (2) the oxidation resistance, and the strength of parts brazed with these alloys, are very good up to temperatures of 800° F., and satisfactory for many applications at temperatures up to 1000° F.; (3) the alloy does not undercut the parent material or diffuse appreciably with it and is therefore suitable for brazing extremely thin sections. Stainless steel parts as thin as 0.002 inch have been joined successfully with this alloy; and (4) in addition to its high temperature oxidation resistance, the alloy possesses excellent corrosion resistance to salt atmosphere and to atmospheres laden with products of combustion of petroleum fuels.

As may be expected, cobalt may be added or substituted for the nickel so as to replace a portion or all of the nickel. The presence of cobalt is particularly beneficial for brazing cobalt-containing metals.

Extensive testing under various conditions has been undertaken to evaluate the joints brazed with the improved alloy set forth herein. An example of the mechanical properties test results is shown in the drawing. The data refer to tensile tests made on very thin sections of stainless steel brazed to other sections five times thicker. Replicate specimens were pulled at both room temperature and at elevated temperature, before and after exposure to various environments. The strength of the thin parent material at room temperature is considered as the basis of comparison, being referred to as 100%. The superior results obtained with the silver-copper-nickel alloy are quite obvious from the drawing. Another factor which is of equal importance, but is of course not visible in the graph, is the substantially lower price of the novel alloy set forth herein.

What is claimed is:

1. A brazed joint comprising a pair of thin stainless steel components having a thickness in the order of .002 inch and a brazing filler eutectic joining said components consisting essentially of about 55% to 75% silver, about 20% to 37% copper and about 1% to 8% of a member selected from a group consisting of nickel, cobalt and mixtures thereof.

2. A brazed joint comprising a minimum pair of thin stainless steel components with a minimum thickness in the order of .002 inch and a brazing filler eutectic joining said components consisting essentially of about 65% silver, 30% copper, and 5% nickel.

3. The method of brazing extremely thin stainless steel components with a wall thickness in the order of .002 inch, comprising the steps of retaining the components in close proximity to each other, bringing the component surfaces which are to be brazed into contact with a brazing alloy eutectic consisting of 55% to 75% silver, about 20% to 37% copper, and about 1% to 8% nickel, and heating the components and the alloy in a dry hydrogen atmosphere at least to the eutectic temperature of the alloy to cause the alloy to flow into brazing engagement with the component surfaces.

4. The method of brazing extremely thin stainless steel components with a wall thickness in the order of .002", comprising the steps of retaining the components in close proximity to each other, bringing the component surfaces which are to be brazed into contact with a brazing alloy eutectic consisting essentially of 65% silver, 30% copper and 5% nickel, and heating the components and the alloy in a dry hydrogen atmosphere at least to the eutectic temperature of the alloy to cause the alloy to flow into brazing engagement with the component surfaces, whereby no undercutting of the component surfaces and no appreciable diffusion of the alloy with the surfaces results.

References Cited in the file of this patent

UNITED STATES PATENTS

| | | |
|---|---|---|
| 1,774,689 | Williams | Sept. 2, 1930 |
| 1,883,650 | Engle | Oct. 18, 1932 |
| 2,123,384 | Silliman | July 12, 1938 |
| 2,303,272 | Haskell | Nov. 24, 1942 |
| 2,805,155 | Gelb et al. | Sept. 3, 1957 |
| 2,844,867 | Wernz et al. | July 29, 1958 |

UNITED STATES PATENT OFFICE
CERTIFICATE OF CORRECTION

Patent No. 2,953,844　　　　　　　　September 27, 1960

Amiel Gelb et al.

It is hereby certified that error appears in the printed specification of the above numbered patent requiring correction and that the said Letters Patent should read as corrected below.

Column 3, line 16, claim 2, line 2, after "with a" strike out -- minimum --.

Signed and sealed this 11th day of April 1961.

(SEAL)
Attest:
ERNEST W. SWIDER
Attesting Officer

ARTHUR W. CROCKER
Acting Commissioner of Patents